(12) United States Patent
Lee et al.

(10) Patent No.: US 7,456,914 B2
(45) Date of Patent: Nov. 25, 2008

(54) LIQUID CRYSTAL DISPLAY DEVICE AND INTEGRATED CIRCUIT INSERTED INTO PANEL GUIDE GROOVE

(75) Inventors: Seok Woo Lee, Seoul (KR); Gi Suck Kwon, Kumi-shi (KR)

(73) Assignee: LG Display Co., Ltd., Seoul (KR)

( * ) Notice: Subject to any disclaimer, the term of this patent is extended or adjusted under 35 U.S.C. 154(b) by 761 days.

(21) Appl. No.: 10/665,474

(22) Filed: Sep. 22, 2003

(65) Prior Publication Data
US 2004/0109123 A1 Jun. 10, 2004

(30) Foreign Application Priority Data
Dec. 6, 2002 (KR) .................. 10-2002-0077400

(51) Int. Cl.
*G02F 1/1333* (2006.01)
*G02F 1/1345* (2006.01)
(52) U.S. Cl. ........................ 349/58; 349/150
(58) Field of Classification Search ............... 349/58, 349/149, 150, 151, 152; 361/681, 749, 789
See application file for complete search history.

(56) References Cited

U.S. PATENT DOCUMENTS

| 4,862,153 A | * | 8/1989 | Nakatani et al. | 345/80 |
| 5,838,412 A | * | 11/1998 | Ueda et al. | 349/150 |
| 6,160,605 A | * | 12/2000 | Murayama et al. | 349/152 |
| 6,613,599 B2 | * | 9/2003 | Imaeda | 438/30 |

* cited by examiner

*Primary Examiner*—Michael H Caley
(74) *Attorney, Agent, or Firm*—McKenna Long & Aldridge LLP

(57) ABSTRACT

An LCD device capable of reducing a size of an integrated circuit substrate and a tape carrier package. The LCD device includes a main support, a liquid crystal panel installed on a front surface of the main support, and a film connected to the liquid crystal panel with a drive integrated circuit that drives the liquid crystal panel mounted thereon, wherein the drive integrated circuit is disposed on the film facing the front surface of the main support.

15 Claims, 6 Drawing Sheets

LIQUID CRYSTAL DISPLAY DEVICE AND INTEGRATED CIRCUIT INSERTED INTO PANEL GUIDE GROOVE

This application claims the benefit of Korean Patent Application No. 2002-77400, filed on Dec. 6, 2002, which is hereby incorporated by reference for all purposes as if fully set forth herein.

BACKGROUND OF THE INVENTION

1. Field of the Invention

The present invention relates to a liquid crystal display, and more particularly to a liquid crystal display capable of reducing the size of an integrated circuit substrate and a tape carrier package.

2. Description of the Related Art

In general, the liquid crystal display (LCD) is a representative flat panel display, and displays a picture corresponding to an image signal by adjusting the transmittance of light beam. More specifically, the utilization of LCDs continues to increase due to characteristics such as lightness, thinness, low power consumption, and so on. Accordingly, the LCD is used in office automation devices and the display device of notebook computers. Further, LCD research has been directed to wide screen, high definition, and low power consumption LCD displays in response to the needs of users.

Referring to FIG. 1, the LCD of a related art comprises a main support 44 of plastic material, a backlight unit stacked on the main support 44, a panel guide 50 installed in the main support 44, a liquid crystal panel 36 installed on the panel guide 50 and a case top 32 of metal material combined with the main support 44.

A reflective sheet 42, a light guide panel 40 and an optical sheet 38, which are included in the backlight unit, are sequentially stacked on the main support 44. To this end, the main support 44 has stepped parts and a plurality of screw grooves into which screws are inserted to secure the case top 32. The reflective sheet 42 reflects light from the backlight unit to the liquid crystal panel 36. The light guide panel 40 guides light from a lamp (not shown) to the liquid crystal panel 36. The optical sheets 38 take light incident at a slant angle from the surface of the reflective sheet 42 and directs the light in a vertical direction into the liquid crystal panel 36.

The panel guide 50 fits on the main support 44 in order to support the liquid crystal panel 36 in which the polarization plate 34 is attached to a rear and a front surface of the liquid crystal panel 36. Accordingly, the panel guide 50 supports the liquid crystal panel 36 and presses the optical sheets 38. The polarization plate 34 acts to enlarge the viewing angle of an image displayed by the liquid crystal panel 36.

The liquid crystal cells are arranged in a matrix between an upper and a lower glass substrates 33, 35 of the liquid crystal panel 36, and a thin film transistor for switching a video signal is formed in each of the liquid crystal cells. The liquid crystal panel 36 is installed on the panel guide 50 to display pictures corresponding to the video signal as the transmittance of each of the liquid crystal cells is changed in accordance with the video signal.

A tape carrier package 56 is attached on the lower substrate 35 TCP with a film and a driver integrated circuit for applying a driving signal to the thin film transistor.

The TCP 56 is mounted between a printed circuit board 54 for supplying the video signal and a data pad on the lower substrate 35 and is divided into a data TCP and a gate TCP. The data TCP has a data drive integrated circuit for supplying the video signal to data lines in response to a control signal from the printed circuit board 54. The gate TCP is mounted at the gate pad on the lower substrate 35 and has a gate drive integrated circuit for supplying a gate signal to the gate lines in response to the control signal from the printed circuit board 54.

The gate drive integrated circuit and a circuit component such as a timing controller (not shown) for controlling the data drive integrated circuit are mounted on the printed circuit board 54. The printed circuit board 54 is connected to the liquid crystal panel 36 through the TCP 56.

The printed circuit board 54 and the TCP 56 are folded in a manner enclosing a rear side of the main support 44, as shown in FIGS. 2a and 2b, and is located at the rear side of the main support 44. Accordingly, the data drive integrated circuit 58 mounted on the TCP is located at the side of the main support 44.

The case top 32 is bent to cover an edge of the liquid crystal panel 36, to thereby enclose the edge of the sides of the surface of the liquid crystal panel 36 as well as the side of the main support 44 on which the backlight unit including the reflective sheet 42, the light guide panel 40, the optical sheets 38, and the liquid crystal panel 36 are sequentially stacked. The case top 32 covers the main support 44 and securely fixes the backlight unit. The case top 32 covers the edge of the liquid crystal panel 36 to protect the liquid crystal panel from an external impact.

In the LCD of the related art having the structure described above, because the printed circuit board 54 is located at the rear surface of the main support 44, the length of the TCP 56 is elongated to cover the pad portion of a front liquid crystal panel 36. As a result, in the LCD device of the related art, the printed circuit board 54 should be located at the rear surface. The length of the printed circuit board 54 is inevitably elongated because the respective TCPs 56 are connected by way of the printed circuit board 54 and a controller should be installed on the printed circuit board 54.

SUMMARY OF THE INVENTION

Accordingly, the present invention is directed to a LCD capable of reducing a size of an integrated circuit substrate and a tape carrier package that substantially obviates one or more of the problems due to limitations and disadvantages of the related art.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with purpose of the invention, as embodied and broadly described the LCD device according to an aspect of the present invention includes a main support, a liquid crystal panel installed on a front surface of the main support, and a film connected to the liquid crystal panel with a drive integrated circuit that drives the liquid crystal panel mounted thereon, wherein the drive integrated circuit is disposed on the film facing the front surface of the main support.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to embodiment of the present invention, example of which are illustrated in the accompanying drawings.

Figure 1:
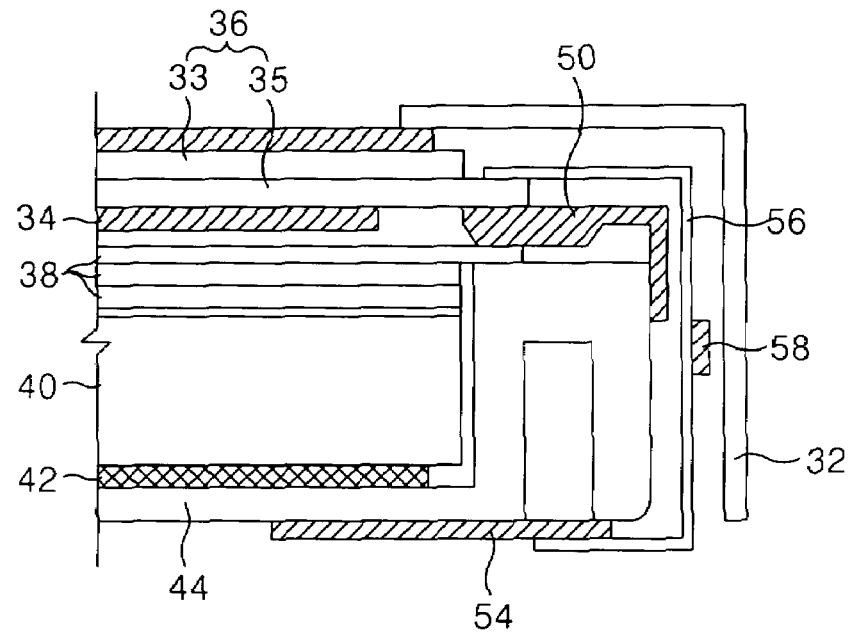
FIG. 1 is a cross sectional view of a portion of an LCD of the related art.
Figure 2A:
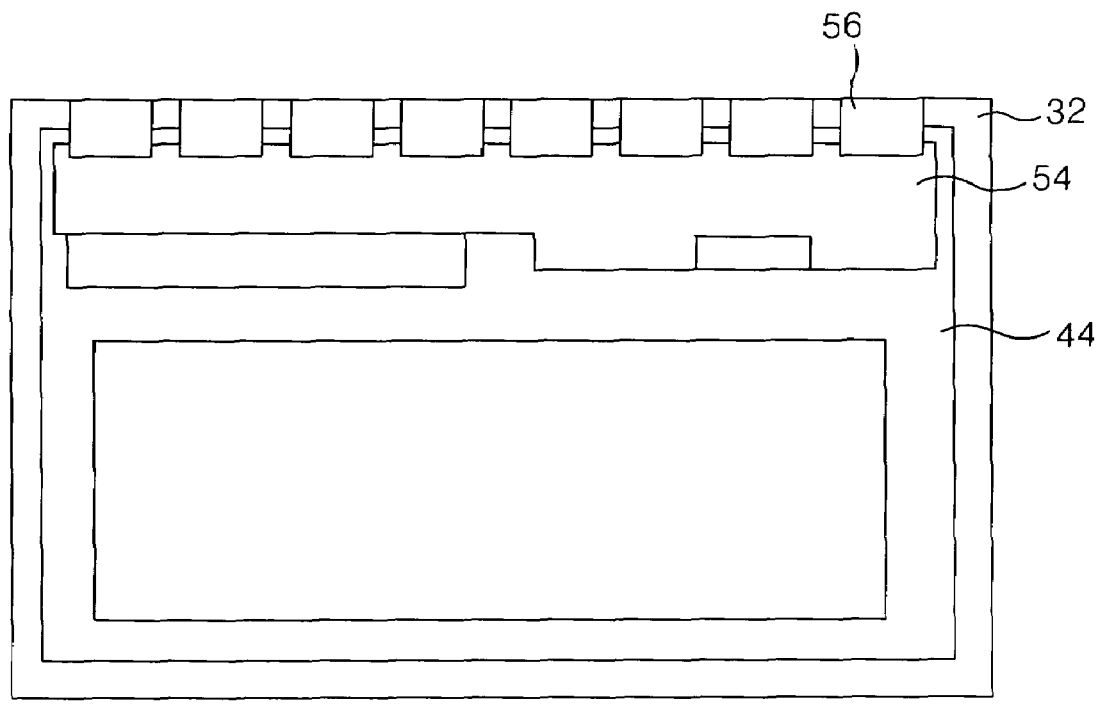
FIG. 2A is a diagram illustrating a rear surface of an LCD of the related art.
Figure 2B:
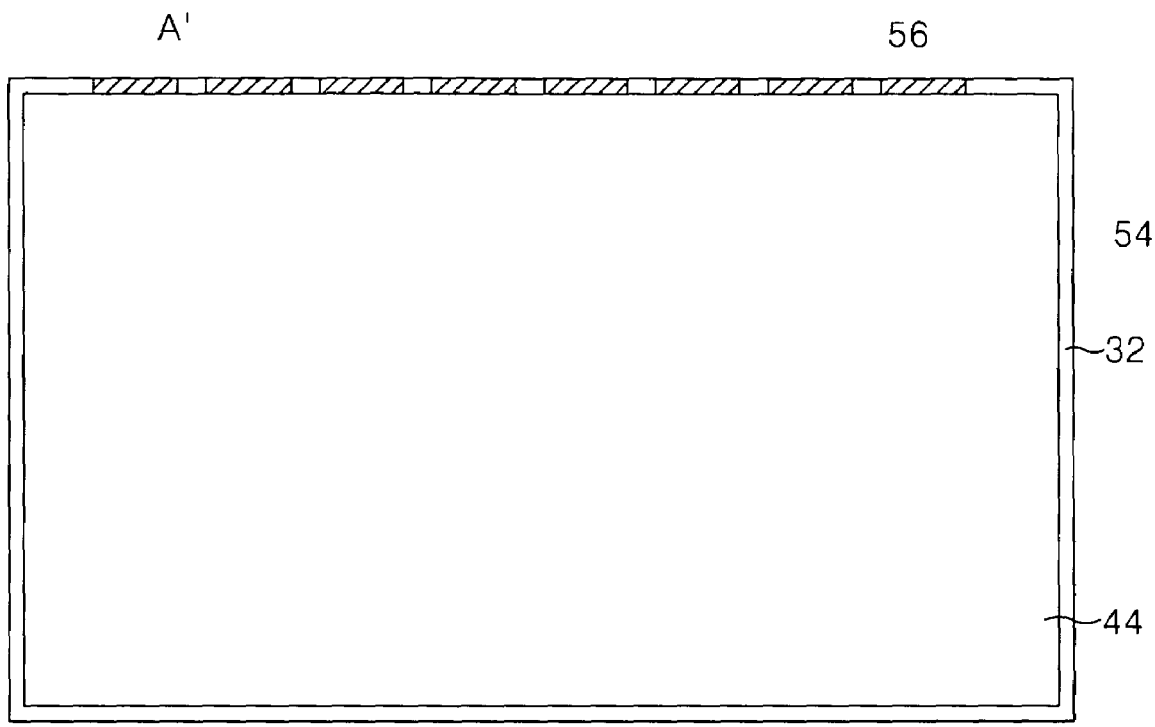
FIG. 2B is a plane view illustrating an LCD of the related art.
Figure 3:
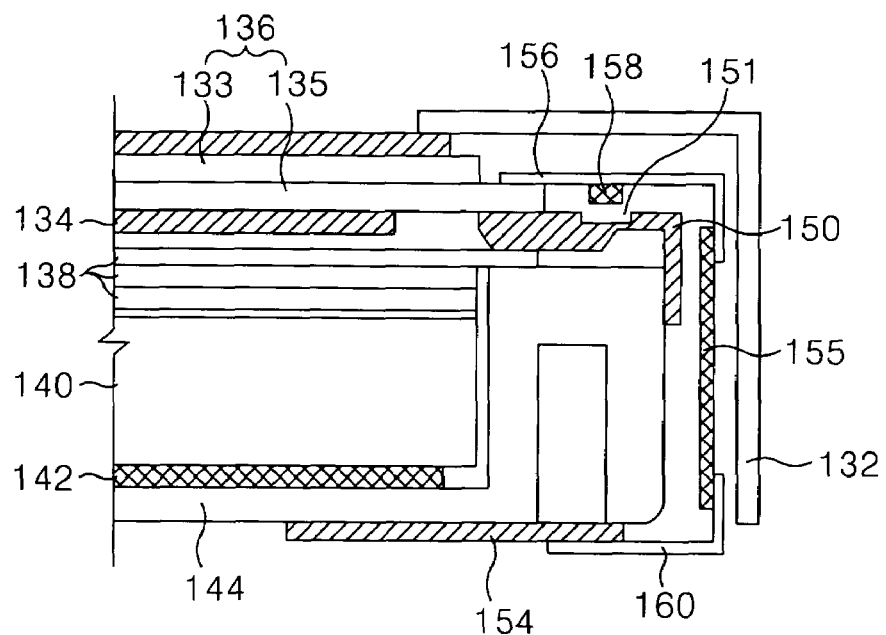
FIG. 3 is a cross sectional view cutting-off a portion of an LCD according to a first embodiment of the present invention.

Referring to FIG. 3, an LCD according to a first embodiment of the present invention comprises a main support 144 of plastic, a material, a backlight unit stacked on the main support 144, a panel guide 150 installed in the main support 144, a liquid crystal panel 136 installed on the panel guide 150, and a case top 132 of a metal material combined with the main support 144.

Further, the LCD comprises a tape carrier package 156 connected to the liquid crystal panel 136, a control board 154 for supplying the driving signal to the TCP 156, a printed circuit board 155 for transmitting the driving signal from the control board 154 to the TCP 156 and a flexible printed circuit film 160 (FPC) connected between the control board 154 and the printed circuit board 155 to transmit the driving signal from the control board 154 to the printed circuit 155.

A reflective sheet 142, a light guide panel 140, and an optical sheet 138, which embody the backlight unit, are sequentially stacked on the main support 144. To this end, the main support 144 has stepped parts and has a plurality of screw grooves into which screws are inserted to secure the case top 132. The reflective sheet 142 reflects light from the backlight unit toward the liquid crystal panel 136. The light guide panel 140 guides light from a lamp (not shown) to the liquid crystal panel 136. The optical sheets 138 take light incident at a slant angle from the surface of the reflective sheet 142 and directs the light in a vertical direction into the liquid crystal panel 136.

The panel guide 150 fits on the main support 144 in order to support the liquid crystal panel 136 wherein the polarization plate 34 is attached to a rear and a front surface of the liquid crystal panel 136. Further, a groove 151 is formed in the panel guide 150. Accordingly, the panel guide 150 supports the liquid crystal panel 136 and presses the optical sheets 138. The polarization plate 134 acts to enlarge the viewing angle of an image displayed by the liquid crystal panel 136.

The liquid crystal cells are arranged in a matrix between an upper and a lower glass substrate 133, 135 of the liquid crystal panel 136, and a thin film transistor for switching a video signal is formed in each of the liquid crystal cells. The liquid crystal panel 136 is installed on the panel guide 150 and the transmittance of each of the liquid crystal cells is changed in accordance with the video signal, to thereby display the pictures corresponding to the video signal.

The case top 132 is bent to cover an edge of the liquid crystal panel 136, to thereby enclose the edge and the sides of the surface of the liquid crystal panel 136 as well as the side of the main support 144 on which the backlight unit including the reflective sheet 142, the light guide panel 140, the optical sheets 138, and the liquid crystal panel 136 are sequentially stacked. The case top 132 covers the main support 144 and securely fixes the backlight unit. The case top 132 covers the edge of the liquid crystal panel 136 to protect the liquid crystal panel from an external impact.

Further, the TCP 156 is installed on the lower substrate 135 with a driver integrated circuit for applying the driving signal to the thin film transistor.

The TCP 156 is divided into a data TCP and a gate TCP. The data TCP has a data drive integrated circuit for supplying the video signal to the data lines of the liquid crystal panel 136. The gate TCP has a gate drive integrated circuit for supplying the gate signal to the gate lines.

The TCP 156 is connected between the lower substrate 135 of the liquid crystal panel 136 and the printed circuit board 155 at the side of the main support 144. The data TCP of the TCP 156 is attached to the data pad on the lower substrate 135 and in addition is attached to the printed circuit board 155. The gate TCP is installed at the gate pad on the lower substrate 135.

The circuit components, such as a timing controller (not shown) for controlling the driving of the data drive integrated circuit and the gate drive integrated circuit, are mounted on the control board 154. The FPC 160 is connected to the control board 154 and the printed circuit board 155 to transmit the driving signal from the control board 154 to the printed circuit board 155. The printed circuit board has a plurality of signal wiring patterns for transmitting the driving signal supplied from the control board 154 through the FPC 160 to the TCP 156.

The TCP 156 installed on the lower substrate 135 of the liquid crystal panel 136 receives the driving signal from the control board 154 through the printed circuit board 155 and the FPC 160 to drive the liquid crystal panel 136 in response to the driving signal from the control board 154.

Figure 4A:
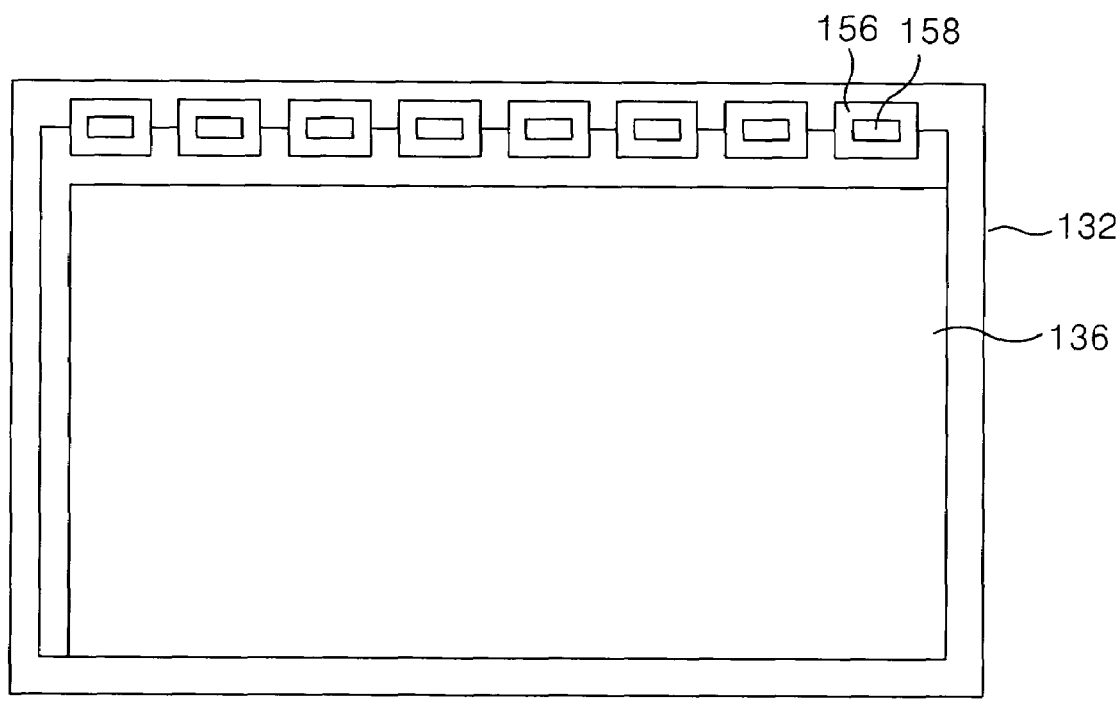
FIG. 4A is a plane view illustrating an LCD according to a first embodiment of the present invention.
Figure 4B:
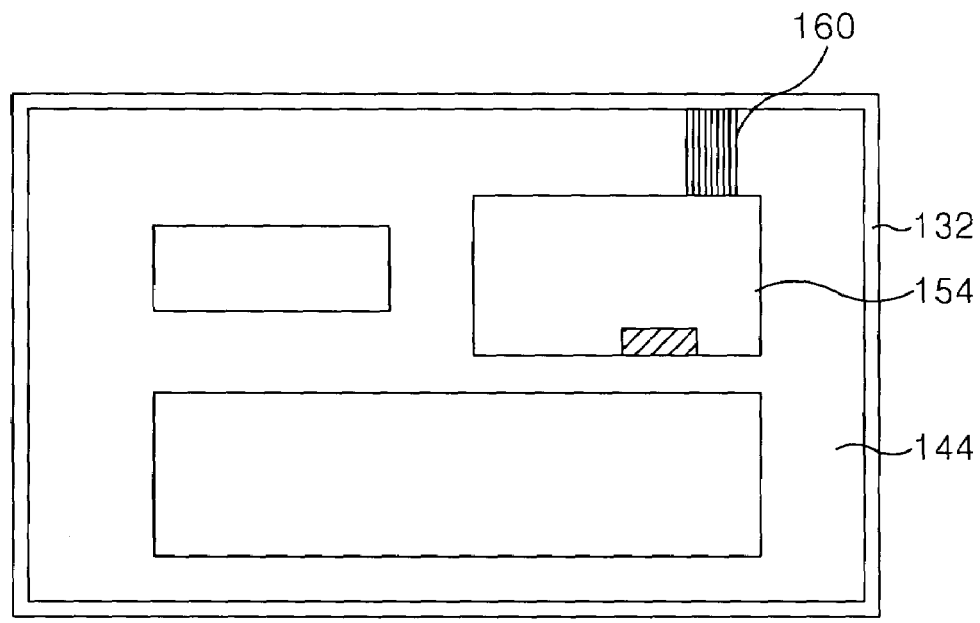
FIG. 4B is a rear surface view illustrating an LCD according to a first embodiment of the present invention.

As shown in FIG. 3, the TCP 156, the printed circuit board 155, the FPC 160, and the control board 154 are folded in a manner enclosing the side and the rear surface of the main support 144 and thus are located at the rear surface of the main support 144. That is, the TCP 156 is located on the panel guide 150, as shown in FIGS. 3 and 4a, and the integrated circuit board 155 is located at the side of the main support 144 as shown in FIG. 3, and the FPC 160 is folded at the side and the rear surface of the main support 144 as shown in FIGS. 3 and 4b. Further, as shown in FIGS. 3 and 4b, the control board 154 is located at the rear surface of the main support 144. The drive integrated circuit 158 mounted in the TCP 156 is inserted into the groove 151 of the panel guide 150. The groove 151 of the panel guide 150 prevents contact between the drive integrated circuit 158 mounted on the panel guide 150 and the TCP 156. It is also possible to have the printed circuit board 155 connected directly to the control board 154, and thus no FPC is needed in this embodiment.

In an LCD according to the first embodiment of the present invention, the TCP 156 having the drive integrated circuit 158 mounted thereon is located above the main support 144. Accordingly, the distance between the panel pad part (not shown) disposed on the lower substrate 135 of the liquid crystal panel 136 and the pad disposed in the printed circuit board 155 is shortened, whereby the length of the TCP 156 is reduced as compared with the related art. Because the length of the TCP 156 is reduced, the fabricating cost of the LCD according to the first embodiment of the present invention is reduced. Further, while the length of the printed circuit board 155 is added to the length of the control board 154, because the length of the LCD according to the first embodiment of the present invention is shorter than that of the printed circuit board of the LCD of the related art, the fabricating cost of the liquid crystal is reduced.

Figure 5:
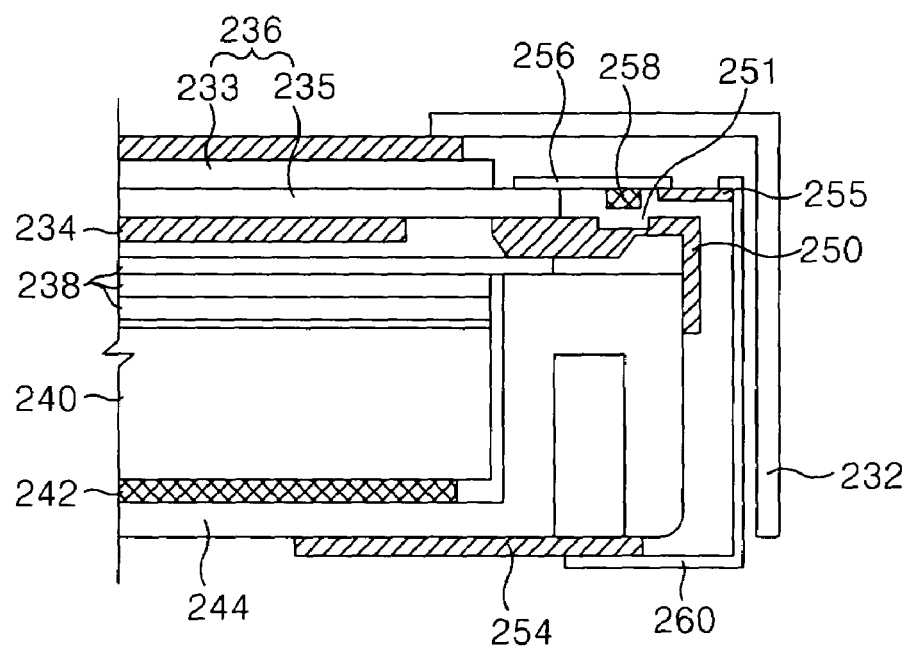
FIG. 5 is a cross sectional view cutting-off a portion of an LCD according to a second embodiment of the present invention.

Referring to FIG. 5, an LCD according to a second embodiment of the present invention includes a main support 244 of a plastic material, a TCP 256 disposed above the main support 244 and connected to the liquid crystal panel 236, a control board 254 providing a driving signal into the TCP 256, a printed circuit board 255 disposed at a front surface of the main support 244 to transmit the driving signal from the control board 254 to the TCP 256, and a FPC 260 connected between the control board 254 and the printed circuit board 255 to transmit the driving signal from the control board 254 to the printed circuit board 255.

A reflective sheet 242, a light guide panel 240, and an optical sheet 238, which are components of the backlight unit, are sequentially stacked on the main support 244. To this end, the main support 244 has stepped parts and has a plurality of screw grooves into which screws are inserted to secure the case top 32.

The panel guide 250 is installed on the main support 244 and is bent in order to support the liquid crystal panel 236 having the polarization plate 234 attached on the rear surface. Further, the panel guide 250 has grooves 251. Accordingly, the panel guide 250 supports the liquid crystal panel 236 and presses the optical sheets 238.

The liquid crystal cells are arranged in a matrix between an upper and lower glass substrates 233, 235 of the liquid crystal panel 236, and a thin film transistor for switching a video signal is formed in each of the liquid crystal cells. The liquid crystal panel 236 is installed on the panel guide 250 and the transmittance of each of the liquid crystal cells is changed in accordance with the video signal, to thereby display pictures corresponding to the video signal.

The case top 232 is bent to cover an edge of the liquid crystal panel 236, to thereby enclose the edge of the surface of the liquid crystal panel 236 as well as the side of the main support 244 on which the backlight unit including the reflective sheet 242, the light guide panel 240, the optical sheets 238, and the liquid crystal panel 236 are sequentially stacked.

The TCP 256 is divided into a data TCP and a gate TCP. The data TCP has a data drive integrated circuit for supplying the video signal to the data lines of the liquid crystal panel 236. The gate TCP has a gate drive integrated circuit for supplying the gate signal to the gate lines.

The TCP 256 is connected between the lower substrate 235 of the liquid crystal panel 236 and the printed circuit board 255 disposed at the front surface of the main support 244. The data TCP of the TCP 256 is attached to the data pad on the lower substrate 235 and in addition is attached to the printed circuit board 255. The gate TCP is installed at the gate pad on the lower substrate 235.

The circuit components, such as the timing controller (not shown) for controlling the driving of the data drive integrated circuit and the gate drive integrated circuit, are mounted on the control board 254. The FPC 260 is connected to the control board 254 and the printed circuit board 255 to transmit the driving signal from the control board 254 to the printed circuit board 255.

The printed circuit board 255 has signal wiring patterns for transmitting the driving signal supplied from the control board 254 through the FPC 260 to the TCP 256. The printed circuit board 255 is installed on one side of the end of the main support 244.

The TCP 256 installed on the lower substrate 235 of the liquid crystal panel 236 is provided with the driving signal from the control board 254 through the printed circuit board 255 and the FPC 260 to drive the liquid crystal panel 236 in response to the driving signal from the control board 254.

Figure 6A:
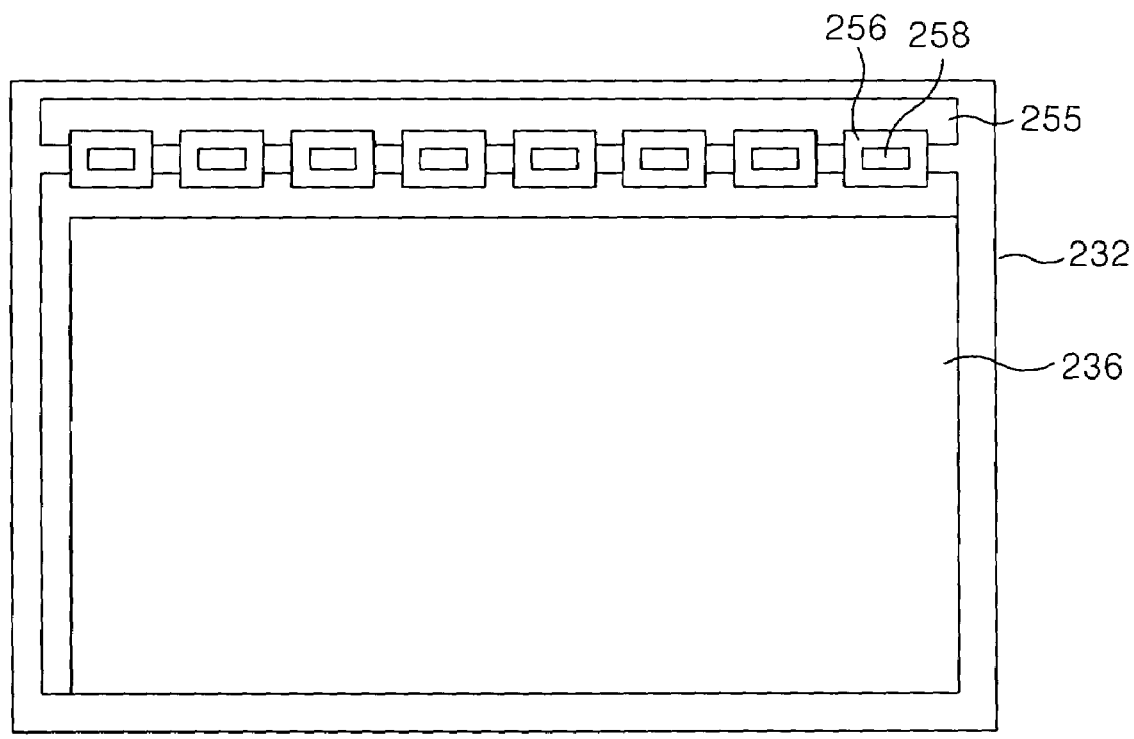
FIG. 6A is a plane view illustrating an LCD according to a second embodiment of the present invention.
Figure 6B:
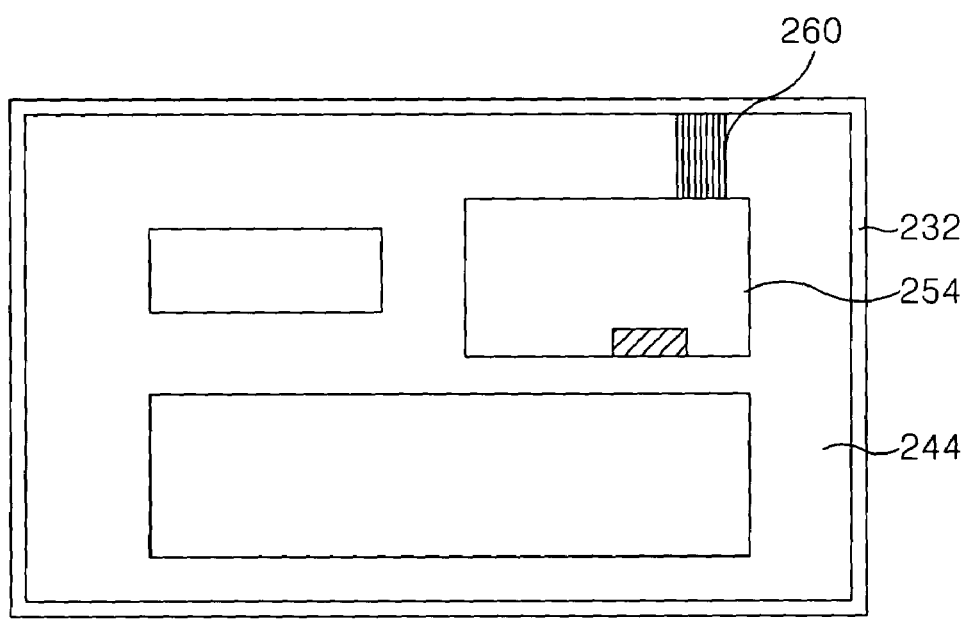
FIG. 6B is a rear surface view illustrating an LCD according to a second embodiment of the present invention.

As shown in FIG. 5, the TCP 256, the printed circuit board 255, the FPC 260 and the control board 254 are folded in a manner enclosing the side and the rear surface of the main support 244 and thus are located in the rear surface of the main support 244. That is, the TCP 256 is located on the panel guide 250 as shown in FIGS. 5 and 6A, the integrated circuit board 255 is located at the front surface of the main support 244 as shown in FIGS. 5 and 6A, and the FPC 260 is folded around the side and the rear surface of the main support 244 as shown in FIGS. 5 and 6B. Further, the control board 254 is located at the rear surface of the main support 244 as shown in FIGS. 5 and 6B. The drive integrated circuit 258 mounted on the TCP 256 is inserted into the groove 251 of the panel guide 250. The groove 251 of the panel guide 250 prevents contact between the drive integrated circuit 258 mounted on the panel guide 250 and the TCP 256.

In an LCD according to the second embodiment of the present invention, the TCP 256 and the printed circuit board 255 having the drive integrated circuit 258 mounted thereon are located above the main support 244 facing the panel guide 250. Accordingly, the distance between the panel pad part (not shown) disposed on the lower substrate 235 of the liquid crystal panel 236 and the pad disposed in the printed circuit board 255 is shortened, whereby the length of the TCP 256 is reduced as compared with the related art. Because the length of the TCP 256 is reduced, the fabricating cost of the LCD according to the second embodiment of the present invention is reduced. Further, while the length of the printed circuit board 255 is added to the length of the control board 254, because the length of the LCD according to the second embodiment of the present invention is shorter than that of the printed circuit board of the LCD of the related art, the fabricating cost of the liquid crystal is reduced.

Figure 7:
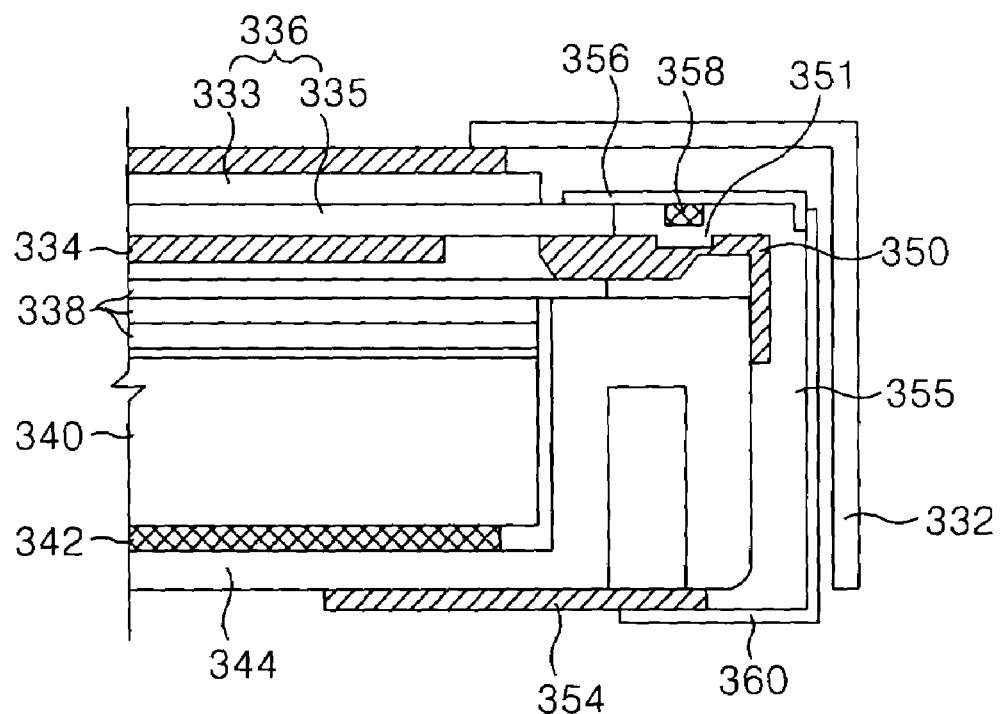
FIG. 7 is a cross sectional view cutting-off a portion of an LCD according to a third embodiment of the present invention.

Referring to FIG. 7, an LCD according to a third embodiment of the present invention includes a main support 344 of a plastic material, a TCP 356 disposed on the front surface of the main support 344 to be connected to the liquid crystal panel 336, a control board 354 providing a driving signal to the TCP 356, and a FPC 360 connected between the main support 344 and the control board 354 to transmit the driving signal from the control board 354 to the TCP 356.

A reflective sheet 342, a light guide panel 340, and an optical sheet 338 which are components of the backlight unit, are sequentially stacked on the main support 344. To this end, the main support 344 has stepped parts and has a plurality of screw grooves into which screws are inserted to secure the case top 332.

The panel guide 350 is installed on the main support 244 and is bent in order to support the liquid crystal panel 336 having the polarization plate 334 attached on the rear surface. Further, the panel guide 350 has grooves 351. Accordingly, the panel guide 350 supports the liquid crystal panel 336 and presses the optical sheets 338.

The liquid crystal cells are arranged in a matrix between an upper and a lower glass substrate 333, 335 of the liquid crystal panel 336, and a thin film transistor for switching a video signal formed in each of the liquid crystal cells. The liquid crystal panel 336 is mounted on the panel guide 350 and the transmittance of each of the liquid crystal cells is changed in accordance with the video signal, to thereby display pictures corresponding to the video signal.

The case top 332 is bent to cover an edge of the liquid crystal panel 336, to thereby enclose the edge of the sides of the surface of the liquid crystal panel 336 as well as the side of the main support 344 on which the backlight unit including the reflective sheet 342, the light guide panel 340, the optical sheets 338, and the liquid crystal panel 336 are sequentially stacked.

The TCP 356 is divided into a data TCP and a gate TCP. The data TCP has a data drive integrated circuit for supplying the video signal to the data lines of the liquid crystal panel 336. The gate TCP has a gate drive integrated circuit for supplying the gate signal to the gate lines.

The TCP 356 is connected between the lower substrate 335 of the liquid crystal panel 336 and the FPC 360 disposed at the front surface of the main support 344. The data TCP of the TCP 356 is attached to the data pad on the lower substrate 335 and in addition is attached to the FPC 360, and the gate TCP is mounted at the gate pad on the lower substrate 335.

The circuit components, such as the timing controller (not shown) for controlling the driving of the data drive integrated circuit and the gate drive integrated circuit, are mounted on the control board 354.

Figure 8:
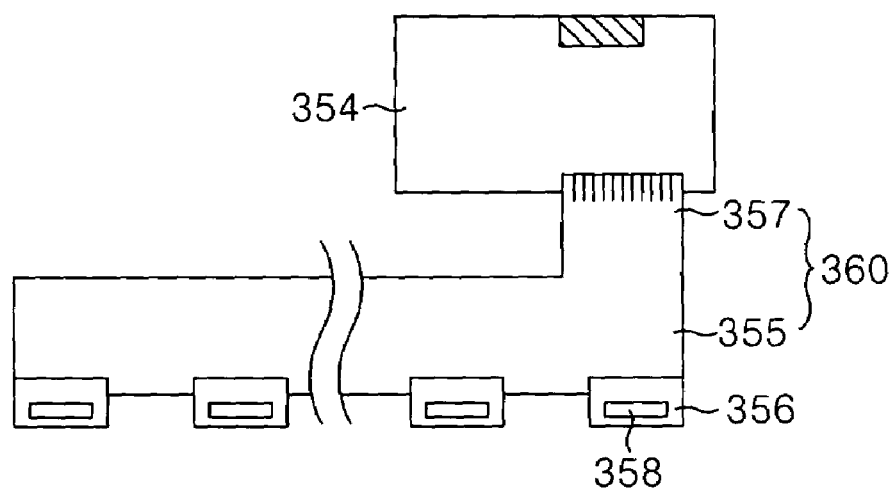
FIG. 8 is a plane view illustrating a FPC and a data board shown in FIG. 7.

The FPC 360 is connected to the control board 354 and the TCP 356 to transmit the driving signal from the control board 354 to the TCP 356. As shown in FIG. 8, the FPC 360 has a pattern part 355 that has the signal wiring patterns for transmitting the driving signal from the control board 354 to the TCP 356, and an extended part 357 extends on one side of the pattern part 355 to be connected to the control board 354.

The pattern part 355 comprises a signal wiring electrode pattern for transmitting the driving signal from the control board 354 to the TCP 356. A plurality of TCPs 356 is connected to the electrode patterns of the pattern part 355 respectively. The extended part 357 is connected to the signal wiring patterns of the pattern part 355 and comprises a plurality of electrode pads connected to the pad of the control board 354.

As shown in FIG. 7, the TCP 356, the FPC 360, and the control board 354 having the data drive integrated circuit 358 mounted are folded around the side and the rear surface of the main support 344. The TCP 356 having the data drive integrated circuit 358 mounted thereon, is located on the panel guide 350, and the pattern part 355 of the FPC 360 is folded to the side of the main support, and the extended part 357 of the FPC 360 is folded to the side and the rear surface of the main support 344. Further, the control board 354 is located at the rear surface of the main support 344. The data drive integrated circuit 358 mounted in the TCP 356 is inserted into the groove 351 of the panel guide 350. The groove 351 of the panel guide 350 prevents contact between the panel guide 350 and the data drive integrated circuit 358.

Accordingly, in the LCD according to the third embodiment of the present invention, the data drive integrated circuit 358 of the TCP 356 attached on the lower substrate of the liquid crystal panel 336 drives the liquid crystal panel 336 in response to the driving signal supplied from the control board 354 through the extended part 357 of the FPC 360 and the pattern part 355.

In the LCD according to the third embodiment of the present invention, the TCP 356 having the drive integrated circuit 358 mounted thereon is located above the main support 344 facing the panel guide 350. Accordingly, the distance between the pads arranged in the TCP 356 having the panel pad part (not shown) arranged on the lower substrate 335 of the liquid crystal panel 336 and having the drive integrated circuit 358 installed, is reduced.

On the other hand, in the LCD according to the third embodiment of the present invention, the FPC 360 may have a plurality of the extended parts extended from the pattern part 355, and in each of the plurality of the extended parts the data drive integrated circuit described above may be mounted. That is, in the LCD according to the third embodiment of the present invention, the TCP 356 is included in the FPC 360.

As described above, the LCD according to the embodiment of the present invention disposes the TCP above the main support and thereby may reduce the length of the TCP mounted between the liquid crystal panel and the control board. Accordingly, the present invention reduces the fabricating cost due to the decreasing of the TCP length.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A LCD device, comprising:
a main support;
a liquid crystal panel installed on a front surface of the main support;
a panel guide between the main support and the liquid crystal panel to support the liquid crystal panel; and
a film connected to the liquid crystal panel with a drive integrated circuit that drives the liquid crystal panel mounted thereon, wherein the drive integrated circuit is disposed on the film apart from the front surface of the panel guide,
wherein the panel guide has a groove into which the drive integrated circuit is inserted.

2. The device according to claim 1, further comprising a control board electrically connected to the film.

3. The device according to claim 2, further comprising a printed circuit board between the film and the control board and having a plurality of signal wiring patterns for transmitting a control signal from the control board to the film.

4. The device according to claim 3, further comprising a flexible printed circuit film connecting the printed circuit board to the control board.

5. The device according to claim 4 wherein the printed circuit board faces only the front surface of the main support.

6. The device according to claim 4, wherein the main support has a side surface and the printed circuit board faces only the side surface of the main support.

7. The device according to claim 2, further comprising a flexible printed circuit film having a signal wiring pattern connected between the film and the control board.

8. The device according to claim 2, wherein the control board is disposed at a rear surface of the main support.

9. The device according to claim 1, further comprising a case top combined with the main support.

10. The device according to claim 9, wherein the case top is secured to the main support with a plurality of screws.

11. The device according to claim 9, wherein the case top is made of metal.

12. The device according to claim 9, wherein the case top is bent to cover an edge of the liquid crystal panel.

13. The device according to claim 1, further comprising a backlight.

14. The device according to claim 1, wherein the film includes a data film attached to a data pad on the liquid crystal panel.

15. The device according to claim 14, wherein the film includes a gate film attached to a gate pad on the liquid crystal panel.

* * * * *